Figure 1:
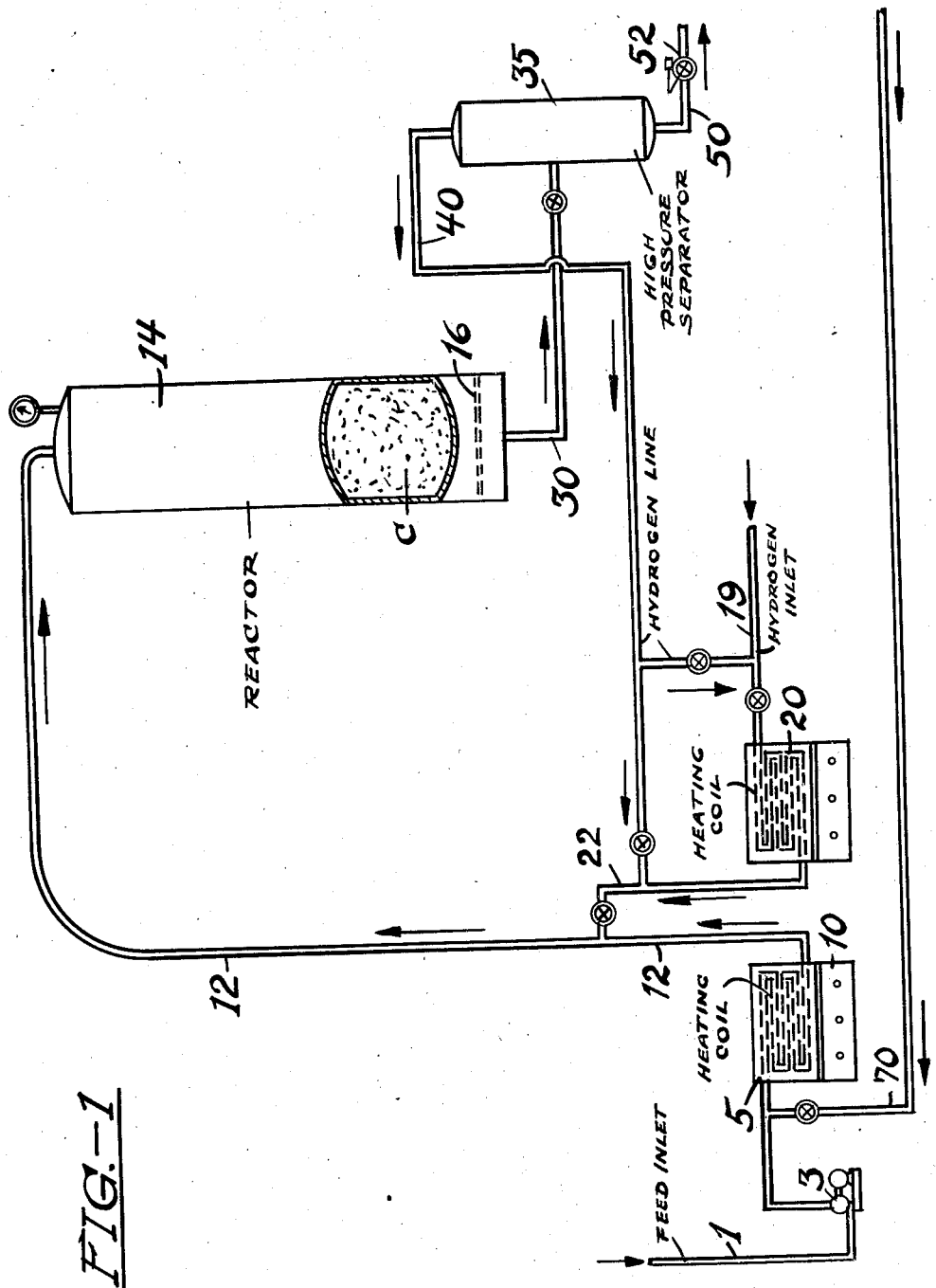

Feb. 12, 1946.    P. E. KUHL    2,394,617
CHEMICAL PROCESS
Filed March 27, 1943    2 Sheets-Sheet 1

Paul E. Kuhl Inventor
By P. L. Young Attorney

Feb. 12, 1946.   P. E. KUHL   2,394,617
CHEMICAL PROCESS
Filed March 27, 1943   2 Sheets-Sheet 2
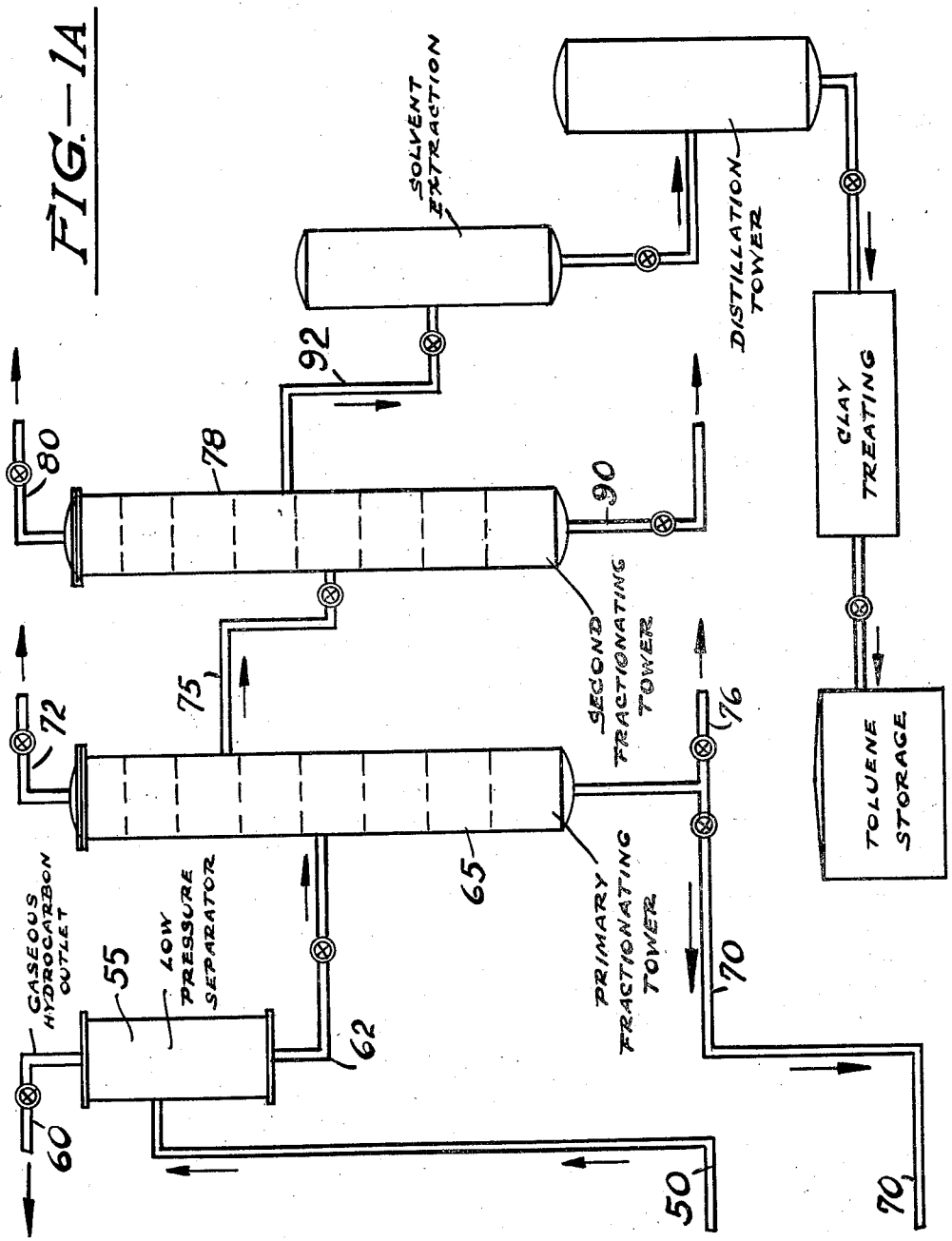
Paul E Kuhl Inventor
By _____ Attorney Patented Feb. 12, 1946

2,394,617

UNITED STATES PATENT OFFICE 2,394,617

CHEMICAL PROCESS

Paul E. Kuhl, Madison, N. J., assignor to Standard Oil Development Company, a corporation of Delaware Application March 27, 1943, Serial No. 480,750

1 Claim. (Cl. 196—50)

The present invention relates to improvements in the reforming of petroleum naphthas and, more particularly, it relates to the reforming of petroleum naphthas carried out in the presence of a catalyst and added hydrogen.

During the reforming of naphthas, which is an operation primarily designed to improve the octane number and in which operation the most characteristic reaction involves the dehydrogenation of naphthenes to form aromatic compounds, it has been previously found by others that the catalyst ordinarily used, namely, a sixth group oxide supported on a base such as activated alumina, may have its catalytic activity extended over a greater period of time, if hydrogen is added with the feed stock passing to the reaction zone. The hydrogen appears to repress coke formation so that the operating phase may be continued for a greater period of time when hydrogen is present than when it is not present, without necessitating a shutdown to regenerate the catalyst. It is believed that the hydrogen saturates olefins formed during the reaction, which olefins, unless saturated, would tend to polymerize under high temperature and pressure conditions prevailing in the reforming zone, with the result that they would deposit carbon on the catalyst, with the eventual result that the efficiency of the catalyst would be impaired to the extent that it would be necessary to discontinue the operation to remove the carbonaceous deposits. As stated, the addition of hydrogen represses the formation of coke on the catalyst and permits the operating phase to be continued for an extended period of time.

It is well known that the metals of the sixth group may serve as both dehydrogenating and hydrogenating catalysts depending on various factors. There does not appear to be any sharp distinction between these two reactions but under certain conditions one can be made to merge directly into the other.

Some of the factors which most profoundly influence the character of the reaction are (1) character of the feed stock, i. e. whether it is paraffinic, olefinic or naphthenic; (2) the temperature, and (3) the pressure. In general the lower temperatures favor hydrogenation and the higher ones dehydrogenation. High pressure favors hydrogenation and low pressure dehydrogenation.

It is not possible to specify the border line pressure and recycle rates which distinguish between hydrogenation and dehydrogenation independent of the catalyst employed, the temperature employed and feed stock composition. In all operations of the so-called dehydrogenation and hydrogenation type, actually both dehydrogenation and hydrogenation take place simultaneously. Whether we call the reaction dehydrogenation or hydrogenation depends entirely on whether the dehydrogenation or hydrogenation reaction predominates. This is a very important factor in commercial operation because if there is a net production of hydrogen, no hydrogen producing facilities are required and this has been one of the primary purposes in developing the dehydrogenation type of operation where there is a net production of hydrogen. With a 100% olefinic feed stock, for example, under the conditions specified in this application it would not be possible to have a dehydrogenation or hydroforming operation because olefins are very readily hydrogenated even at pressures as low as 100 lbs. On the other hand, with a feed stock that is 100% naphthenes, it would not be possible at the temperatures specified in this application to hydrogenate unless cracking of the naphthenes occurred and our experience has been that feed stocks containing only 50% naphthenes will actually give a net production of hydrogen up to pressures of at least 700 or 800 lbs. per square inch. The border line pressure where we might visualize going from dehydrogenation to hydrogenation is dependent also as stated above on the catalyst and on the temperature employed. It is dependent upon the catalyst employed because the nature of the catalyst determines the relative amounts of hydrogenation or dehydrogenation and side reactions such as cracking taking place. The more the cracking the lower the border line pressure will be because the olefins are immediately hydrogenated as formed. The temperature influences the border line pressure between hydrogenation and dehydrogenation principally because of the energy relationships between the reacting materials and the products. Thermodynamic considerations show, as is borne out in practice, that at low temperatures such as 600 and 700° F. the border line pressure will be lower than at high temperatures such as 900–1000° F. as specified in this application.

The following table shows the effect of pressure when treating West Texas naphtha which is highly naphthenic at 875 to 925° F., using a catalyst comprising metals of the sixth group, in the presence of 2000–5000 cu. ft. of hydrogen per bbl.

| Pressure, #/sq. in. | Net H₂ production cu. ft./bbl. | Cycle time [1] |
|---|---|---|
| Hydroforming: | | |
| 100 | 450 | 3 hrs. |
| 200 | 350 | 6 hrs. |
| 400 | 200 | 12 hrs. |
| 600 | 50 | 24 hrs. |
| 650 | 0 | |
| Hydrogenation: | | |
| 750 | 1200 consumption | 30–60 days. |
| 3000 | 1500 consumption | 12 months. |

[1] Cycle time is defined as the length of time the operation can be carried out before sufficient carbon is deposited on the catalyst to require reactivation.

My present invention is an improvement over the general procedure of catalytic reforming carried out in the presence of hydrogen in that I vary the hydrogen pressure during the operation, the maximum pressure existing during the initial stages of the operating phase and gradually tapering off as the operation continues.

One object of the present invention therefore is to improve the catalytic reforming of petroleum naphthas with regard to the length of time during which the process may be operated without having to regenerate the catalyst.

Another object of my present invention is to increase the total catalyst life of a reforming catalyst by reducing the number of regenerations which are necessary in a given period of time; thus, reducing the number of exposures of the catalyst to the damaging influence of regeneration which is usually performed by burning off fouling contaminants.

Other and further objects will appear from the following more detailed description and claims.

In the accompanying sketch I have shown diagrammatically an apparatus layout in which a preferred modification of my invention may be performed.

In order to further aid in the description of my invention I shall set forth a specific embodiment of my invention and in so doing I shall refer to the accompanying drawings.

In the drawings 1 represents a charge line through which is charged a feed stock comprising West Texas naphtha having a boiling range of 250° F. to 400° F. and containing approximately 40% of naphthenes. The feed stock is pumped by a pump 3 into a fired coil 5 disposed in a suitable furnace 10 where the naphtha is heated to a temperature of about 900° F., whereupon it is withdrawn from the system through line 12 and thence discharged into a reactor 14 containing catalyst C supported on a foraminous member 16. The catalyst preferably is in a physical form of granules, lumps, extruded lengths, and the like, having an average size of $\frac{1}{16}$ to $\frac{1}{8}$ inch, more or less. A good physical form for the catalyst is the form of pills or pellets approximately the size of an aspirin tablet but having the thickness of from $\frac{1}{8}$ to $\frac{1}{16}$ of an inch. Meanwhile hydrogen from some source is introduced into the system through line 19 and after heating in a suitable furnace 20 to the same temperature as the oil in furnace 10, is discharged through line 22 into line 12 and accompanies the oil vapors into the reactor. The amount of hydrogen mixed with the oil is from 2000 to 8000 cu. ft. of hydrogen per barrel of oil on a cold oil basis, that is to say at the start of the operation, I add extraneous hydrogen and by means of the hydrogen run the pressure in the reaction zone up to 700–800 lbs. Thereafter the extraneous source of hydrogen is cut off and I depend on hydrogen produced in the system.

With respect to the catalyst C in reactor 14 the same is preferably a sixth group oxide supported on activated alumina, that is to say, it may be chromium oxide supported on activated alumina, chromium oxide comprising about 5–20% by weight of the total mass, or it may be molybdenum oxide supported on activated alumina, the amount of molybdenum oxide being from 5–12% by weight of the total mass. Instead of using alumina, other bases may be used such as magnesia. Also, the catalyst may be a mixture of nickel and tungsten sulfides. These catalysts are well known in the art and a further description is not deemed necessary. It will be sufficient to state that any suitable reforming catalyst may be employed.

At the beginning of the operation the pressure existing in the system if of the order of 700–800 lbs./sq. in. Under the conditions stated, the feed stock undergoes reforming and the products are withdrawn through line 30 and preferably discharged into a high pressure separator 35 from which the hydrogen may be taken off overhead through line 40 and recycled to line 22 or to line 19, at least in part, if it requires reheating.

In the hydroforming operation usually fairly large amounts of hydrogen are produced and at the same time hydrocarbon gases such as methane, ethane and propane are produced. These products in the ordinary hydroforming operation leave the system in two ways. Some of this mixed gas escapes in the liquid product when the gas and liquid are separated. Here the hydrocarbon components and particularly the heavy hydrocarbons are selectively removed due to their solubility. The remainder of the mixed gas produced is generally bled from the system in such a way as to maintain the operating pressure constant at the level desired. It will be recognized that when the hydrocarbons are removed by absorption in the liquid product the hydrogen concentration of the gas is increased because of the selective absorption of the hydrocarbons. On the other hand, bleeding gas from the system has no effect on the hydrogen concentration. In the hydroforming operation it is desirable to maintain a high hydrogen concentration in the recycled gas in order to minimize coke formation on the catalyst. At the same time, it is desirable to maintain the total pressure and keep the hydrogen partial pressure as high as possible for the same reason. In this operation then, I am not bleeding any appreciable amount of gas directly from the system but all gas is removed by selective absorption in the liquid product. In this way, both the hydrogen concentration and the total pressure are maintained the highest possible at all times. This results in an operation where the pressure gradually decreases from the beginning to the end of the reaction period because of the gradual decrease in the activity of the catalyst.

The products depleted of hydrogen are withdrawn from separator 35 through line 50 carrying a pressure reducing valve 52 and thence discharged into a low pressure separator 55 which operates under a pressure of 100 lbs./sq. in. In this separator an overhead product containing predominantly normally gaseous hydrocarbons, such as methane, ethane, ethylene, propane, proylene, butane and the butenes and also some isobutane, is withdrawn from low pressure separator 55 through line 60.

The products may be disposed of in any suitable manner to recover the desirable products contained therein. The products from the bottom of separator 55 are withdrawn through line 62 and thence discharged into a primary fractionator 65. In the modification I have shown primary fractionator 65 contains the heavy ends comprising essentially the unchanged feed stock in addition to higher boiling constituents which are withdrawn from fractionator 65 through line 70 and these may be recycled through line 1 for further treatment in the process or they may be withdrawn from the system through line 76. An overhead fraction may be withdrawn from fractionator 65 through line 72. A fraction boiling in the range from 200–375° F. may be withdrawn from fractionator 65 through line 75 and this product after suitable purification by distillation, clay treatment, and the like, forms a stock for high octane number automotive fuel or an aviation gasoline.

Referring again to the product of 75 this may be delivered to a second fractionating column 78 where it may be fractionated into a fraction boiling below 200° F. which may be taken off through line 80, and a fraction boiling above 240–400° F. which may be taken off through line 90, and a third fraction boiling from 200–240° F. taken off through line 92. The product from line 92 will contain appreciable quantities of toluene and this product may be subjected to the known operation of solvent extraction to recover toluene. The products in lines 80 and 90 may be combined to form a lacquer solvent for which purpose they would be ideally suitable because they contain aromatics such as benzene and xylene. The various products formed in the reforming operation are many and variegated and the actual utility for which they are finally processed does not form the gist of this invention. The reformed products may be processed in any known manner to recover the desired products.

As stated, the invention in this case resides in means for operating the reforming operation for longer periods of time than heretofore possible. As also previously indicated, the operation is carried out by varying the pressure of the hydrogen progressively downwardly as the operation proceeds. This is accomplished by recycling hydrogen from hydrogen separator 35 through line 40 to line 22 or line 19, according to the following scheme. The apparatus is pressured with extraneous hydrogen at reaction temperatures, say 700–800 lbs. per square inch. The operation thereafter is self-sustaining as to hydrogen due to the fact that hydrogen, of course, is produced in the process. As the operation proceeds, coke is deposited on the catalyst reducing its activity so that less hydrogen is produced and the pressure automatically decreases, since no gas is released other than that dissolved in the condensed hydrocarbons in the separator. The process is continued in the manner indicated until the hydrogen production is insufficient to maintain the desired minimum pressure.

According to the method which I have described above maximum use is made of the hydrogen produced in the process in suppressing coke formation and consequently the length of the cracking phase as regards time and the cost of regeneration equipment and utilities is reduced, since the catalyst does not have to be regenerated as many times during a given period, as would otherwise be the case. My process also has the advantage that it is operated under a higher average pressure and this in turn results in a higher yield of product of a given octane number.

The following table compares the results obtained when hydroforming under conventional conditions and under the conditions of the present invention, when operating for the same yield of the same quality of gasoline. In run "A" recycle gas was bled from the system to keep the pressure constant, while in run "B" pressure was built to the desired initial level and thereafter the total quantity of the gas made was recycled except that which was carried out with the liquid product.

*West Texas heavy naphtha—Same reactor and same catalyst*

[Length of run, 6 hrs.]

|  | "A" run 104 | "B" run 130 |
|---|---|---|
| Reactor pressure, per sq. in. | 200 | 800–520 |
| Average catalyst temperature, °F. | 932 | 990 |
| Average temperature drop thru reactor | 48 | 16 |
| Feed rate, v./v./hr. | 0.51 | 1.0 |
| Gas recycle ratio cu. ft./bbl. | 690 | 5,450 |
| $H_2$ in recycle gas per cent (average) | 74 | 35 |
| Recycle gas scrubbed | Yes | No |
| Gasoline yield, per cent | 85.1 | 85.0 |
| Per cent at 212° F. | 18.0 | 22.5 |
| Per cent at 356° F. | 88.0 | 90.0 |
| End point, °F. | 413 | 413 |
| ASTM octane No. | 78.9 | 79.0 |
| +1.5 cc. tetraethyl lead per gal. | 83.6 | 85.0 |
| Per cent carbon on catalyst | 1.80 | 0.43 |

Pressure conditions at each hour during run:

| | | |
|---|---|---|
| Start | 200# | 800 |
| 1 | 200# | 810 |
| 2 | 200# | 740 |
| 3 | 200# | 680 |
| 4 | 200# | 600 |
| 5 | 200# | 560 |
| 6 | 200# | 520 |

$H_2$ concentration in recycle gas at each hour during run:

|  | Run 104 | Run 130 |
|---|---|---|
|  | Per cent | Per cent |
| Start | 70 | 24 |
| 1 | 75 | 39 |
| 2 | 73 | 39 |
| 3 | 76 | 38 |
| 4 | 75 | 36 |
| 5 | 75 | 35 |
| 6 | 75 | 35 |

It will be noted that the feed rate under this invention is twice as great as in conventional 200 lbs. operation and that the temperature drop across the reactor is much less. The carbon deposit on the catalyst is much less (0.43% vs. 1.80%), which shows that while run "A" catalyst would have to be regenerated after 6 hours, run "B" could have continued for a much longer period before it would have reached approximately 2.0% carbon where regeneration would be required.

Many modifications of my invention will suggest themselves to those familiar with this art.

What I claim is:

In the catalytic reforming of petroleum naphthas which are rich in naphthenic hydrocarbons, the improvement which comprises contacting the petroleum naphtha in vapor phase at an elevated temperature and pressure with a reforming catalyst and hydrogen in a reaction zone, initially supplying hydrogen from an extraneous source such that at the start of the process the pressure is about 700 to 800 pounds/sq. in., thereafter discontinuing the supply of extraneous hydrogen as the operation proceeds, operating the process with a net production of hydrogen which decreases as the operation proceeds and with concomitant drop in pressure, withdrawing reaction products from the reaction zone, passing them to a high pressure separator and separating hydrogen therefrom, recycling said hydrogen to the reaction zone, passing the products from the high pressure separator to a low pressure separator to vaporize the products and fractionating the said vapors.

PAUL E. KUHL.